United States Patent
Efremkina

(10) Patent No.: US 10,094,631 B2
(45) Date of Patent: Oct. 9, 2018

(54) METHOD OF TRACKING FIREARMS BY AUTOMATIC ELECTRONIC COMMUNICATION SYSTEM

(71) Applicant: Anastasia P. Efremkina, Ardsley, NY (US)

(72) Inventor: Anastasia P. Efremkina, Ardsley, NY (US)

( * ) Notice: Subject to any disclaimer, the term of this patent is extended or adjusted under 35 U.S.C. 154(b) by 0 days.

(21) Appl. No.: 15/406,879

(22) Filed: Jan. 16, 2017

(65) Prior Publication Data

US 2018/0112940 A1    Apr. 26, 2018

Related U.S. Application Data

(62) Division of application No. 14/523,464, filed on Oct. 24, 2014, now Pat. No. 9,546,835.

(51) Int. Cl.
   *G08B 21/02*   (2006.01)
   *F41A 17/06*   (2006.01)
   *G08B 13/24*   (2006.01)
   *G01S 19/14*   (2010.01)

(52) U.S. Cl.
   CPC ............ *F41A 17/063* (2013.01); *G01S 19/14* (2013.01); *G08B 13/2491* (2013.01); *G08B 21/0261* (2013.01)

(58) Field of Classification Search
   CPC ...... F41A 17/063; F41A 17/066; F41A 17/54; F41A 17/06; F41A 17/44; F41A 17/08; F41A 19/09; F41A 19/59; G01S 19/14; G01S 5/0027; G01S 19/13; G01S 19/16; G06N 5/02; G06Q 10/00; G06Q 50/10; G06Q 10/08; G06Q 10/087; G08B 13/2491; G08B 21/0261; G08B 21/0269; G08B 13/1427; G08B 13/2474; G08B 21/0294; G08B 25/10; G08B 25/12; G08B 7/062; H04Q 2213/13095; Y10T 29/49817; F41C 33/0209; F41J 5/10; G06F 21/35; G06K 9/0002; H04N 5/247; H04W 4/005; H04W 4/008; H04W 4/027; H04W 88/04; Y10S 224/911
   USPC .......... 340/539.13, 568.1, 573.4, 539.1, 531, 340/571, 5.1, 5.2, 5.33, 5.7, 5.73
   See application file for complete search history.

(56) References Cited

U.S. PATENT DOCUMENTS

| | | | |
|---|---|---|---|
| 5,735,070 A * | 4/1998 | Vasquez | F41A 9/62 42/1.02 |
| 6,230,946 B1 * | 5/2001 | Vor Keller | F41A 17/066 224/244 |
| 6,791,451 B1 * | 9/2004 | Muise | G08B 25/10 340/10.1 |

(Continued)

*Primary Examiner* — Daniel Previl
(74) *Attorney, Agent, or Firm* — Lawrence G. Fridman, Esq.; Feigin & Fridman, LLC

(57) ABSTRACT

This invention provides a system, method and algorithm for automatic electronic communication between a firearm formed with a location tracking system and a signal emitting arrangement. A data processing system is provided at a restricted firearm-free-zone established around key public sites (schools, mass gathering places etc.). The safety and security system for tracking firearms of the invention is arranged, so that upon approaching the restricted firearm-free-zone an unauthorized firearm activates a security protocol, so as to trigger an automatic alarm, dispatch of police and EMS etc.

18 Claims, 3 Drawing Sheets

(56) References Cited

U.S. PATENT DOCUMENTS

| | | | |
|---|---|---|---|
| 2010/0315235 A1* | 12/2010 | Adegoke | G01S 19/16 340/568.1 |
| 2012/0242816 A1* | 9/2012 | Cruz | F41A 17/063 348/77 |
| 2014/0173961 A1* | 6/2014 | Goren | H04W 48/04 42/70.11 |

* cited by examiner

METHOD OF TRACKING FIREARMS BY AUTOMATIC ELECTRONIC COMMUNICATION SYSTEM

CROSS REFERENCE TO RELATED APPLICATIONS

This Application is a Divisional of a currently pending U.S. patent application Ser. No. 14/523,464 filed: Oct. 24 2014, which Application is hereby incorporated in its entirety by reference.

FIELD OF THE INVENTION

The invention relates to safety and security systems in general, and more specifically it relates to a security system for tracking firearms and detecting whether unauthorized firearms are brought to a restricted area.

BACKGROUND OF THE INVENTION

In many states, the carrying of firearms is restricted in certain facilities, such as schools, bars, airports and the like. However, there are rarely any systems available for detecting whether someone is bringing unauthorized firearm into a restricted area. Thus, it has been long felt and unsolved need to provide a safety and security system for tracking/detecting firearms illegally brought into restricted public areas. There is a need for the security system to be used to prevent penetration of unauthorized firearms into restricted firearm-free-zones established around key public sites to ensure maximum public safety, but without impeding on fundamental gun user's rights.

SUMMARY OF THE INVENTION

An essential purpose of this invention is to secure public safety by tracking firearms and to prevent penetration of unauthorized firearms into restricted firearm-free zones, which are established around key public sites, such as for example schools, theatres, mass gathering places etc. A safety and security system for tracking firearms of the invention is arranged, so that upon approaching such restricted zones an unauthorized firearm activates a security protocol causing at least one of security measures, including but not limited to: trigger an alarm, dispatch of police, EMS, perhaps other first responders. The restricted firearm-free-zones can be formed and defined by Global Positioning System (G.P.S.), or can be defined through the use of cellular towers or any other similar arrangement.

On the other hand, according to the safety and security system an authorized firearm carried by a professional security personal or policemen generates differently coded wireless signal. Thus, a security operator is able to immediately distinguish the presence of an authorized weapon from an unauthorized one, and to prevent unnecessary activation of the security protocol measures.

DETAILED DESCRIPTION OF THE INVENTION

Figure 1:
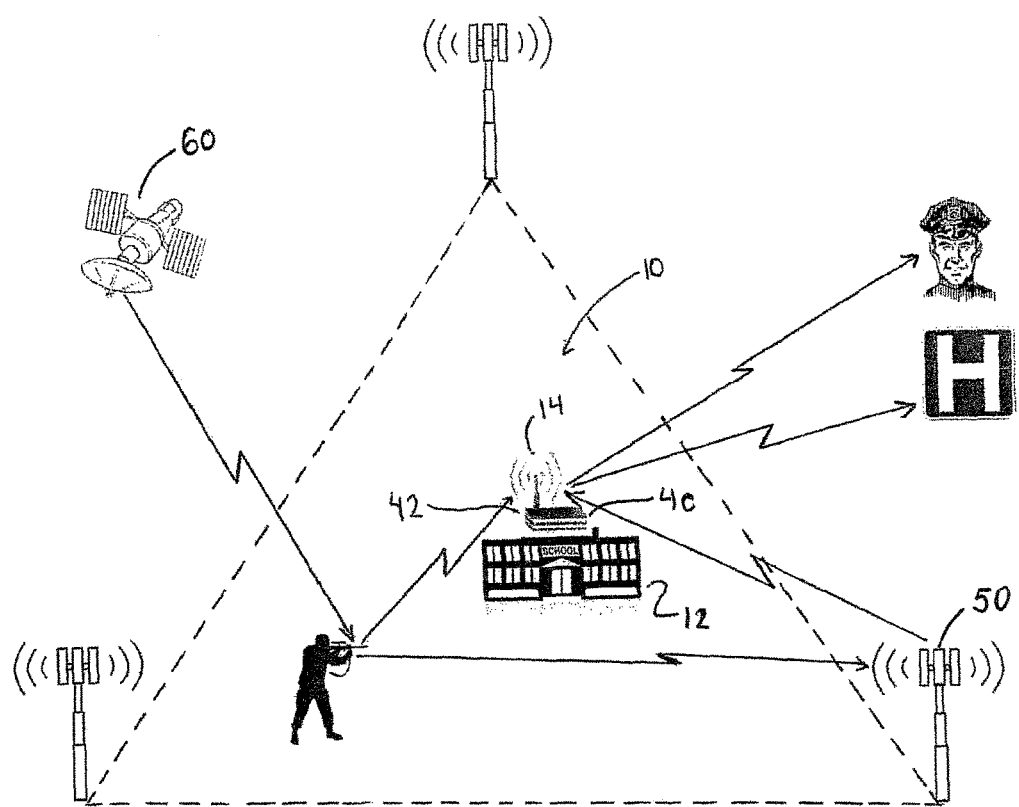
FIG. 1 is a schematic diagram illustrating a safety and security system for tracking firearms of the invention.

Referring now to FIG. 1, which is a schematic diagram showing a restricted firearm-free-zone 10 of the invention established around a key public site 12, such as a school for example. It will be discussed below that a central location of electronic communication processing center 14 including a receiving antenna and computer server is provided to form a part of the firearm-free-zone processing system. In the illustrated embodiment the Global Positioning System (GPS) 60 is utilized in the formation of the restricted zone and is used in the operation of safety and security system of the invention for tracking unauthorized firearms. GPS is a space-based satellite navigation system that provides location and time information to a firearm equipped with the GPS receiver, where there is an unobstructed line of sight to GPS satellites. GPS is maintained by the United States government. In addition to GPS, other navigation systems can be used to track the unauthorized firearms in the safety and security system of invention. Among such alternate navigation systems usable by the invention is The Russian Global Navigation Satellite System (GLONASS).

Figure 2:
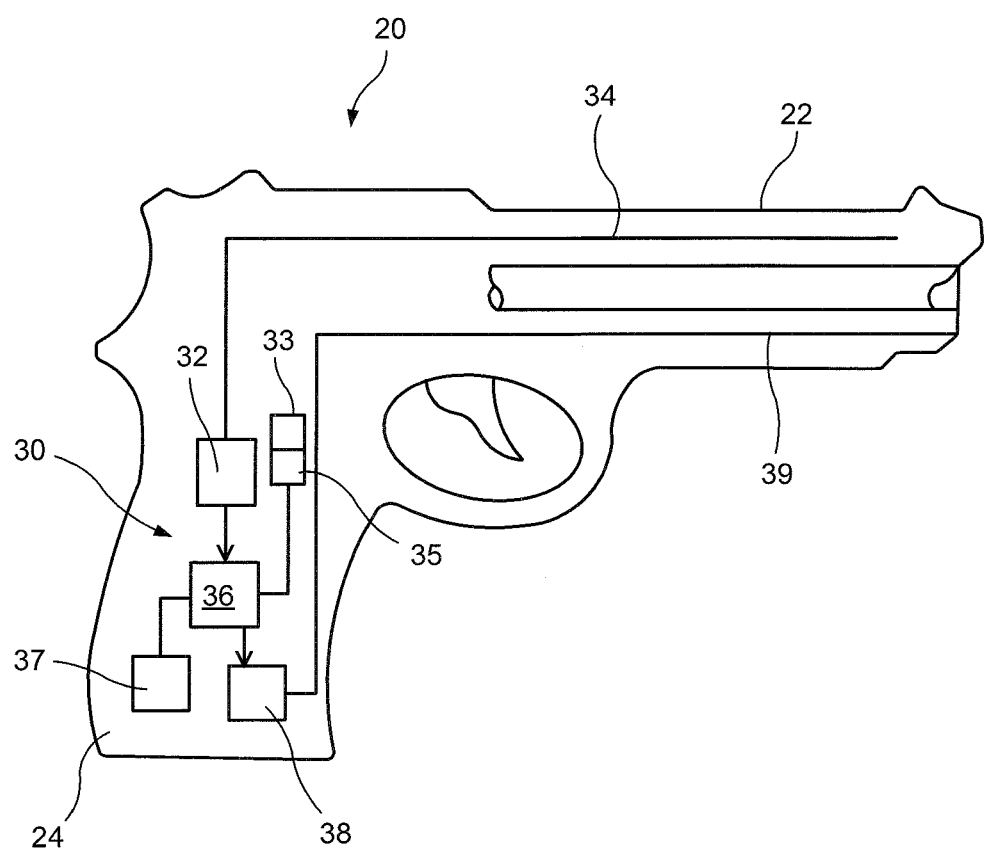
FIG. 2 is a diagram of a firearm with a tracking device.

A typical firearm handgun/pistol 20 having at least a barrel 22 and a handle 24 adapted for use in the safety and security system of the invention, is illustrated in FIG. 2. Although a handgun/pistol 20 is illustrated in FIG. 2, however, it should be understood that the following description of the safety system of the present invention is equally applicable to any type of firearm, including rifles, etc.

The safety and security system includes a firearm tracking device 30 disposed within the firearm 20. The firearm tracking device 30 consists of a GPS signal receiving arrangement 32 with a receiving antenna 34. Additionally a firearm tracking device 30 includes an internal positioning unit 35 formed with an internal motion-sensing arrangement 33 which can be in the form of accelerometers, gyroscopes or any other motion-sensing device. The internal positioning unit 35 is capable of tracking position of a firearm relative to a known starting point based on data received from the respective motion-sensing arrangement. A microprocessor 36 processes the information data from the GPS signal receiving arrangement 32 and the internal positioning unit 35, so as to provide controlling functions. A wireless signal emitting arrangement 38 with an emitting antenna 39 are provided to communicate the firearm location data to the firearm-free zone computer server 42. Although location of various element of the tracking device within the firearm may vary, in the preferred embodiment the receiving antenna 34 of the GPS signal receiving arrangement and the emitting antenna 39 are disposed along the barrel 22. On the other hand, the GPS receiving arrangement 32, the internal positioning unit 35, the microprocessor 36, the wireless signal emitting arrangement 38 and a power supply unit 37, such as battery are disposed within the handle 24 of the firearm. The receiving antenna 34 and the emitting antenna 39, preferably extend along the whole length of the barrel 22 preventing blocking or tampering such antennas to avoid tracking the firearm.

The tracking device 30 is securely positioned within a firearm and cannot be removed without causing substantial damage. The system can generate a "tampered with" signal if a non-authorized attempt to remove the antennas 34, 39 or other parts of the tracking device should occur. As to another aspect of the invention, the firearm locks itself if the tracking device 30 is removed or does not work.

In GPS satellites continually transmit radio messages that include: the time when the message is transmitted and, satellite position at time of message transmission. The GPS signal receiving arrangement 32 by means of the receiving antenna 34 is able to receive geographic position satellite coordinate signals and time and calculates the firearm location coordinates by precisely timing the signals sent by GPS satellites.

The GPS satellites signal can be received and successfully processed when the receiving antenna 34 is situated within an unobstructed line of sight to multiple GPS satellites. However, the system of the invention is also capable of performing its task when a firearm is situated out of site of GPS satellites. In such situations the internal positioning unit 35 is able to track the position of a firearm relative to a known starting point which will be the last GPS data location of the firearm. Such data from the respective internal motion-sensing arrangement 33 is processed by the microprocessor 36 to calculate the position of a firearm relative to a known starting point which may be a previous firearm location point calculated based on the signal received from the GPS. An internal positioning unit 35 together with microprocessor 36 allows to track the position of a firearm in between the data points obtained thorough the GPS.

In one embodiment the internal motion-sensing arrangement 33 of the internal positioning unit 35 can be used to activate the firearm tracking device 30. In a standard mode of this embodiment, when the firearm not in use or stored, to minimize use of battery power, the firearm tracking device 30 and the signal emitting arrangement 38 are not activated and signals are not emitted. However, when the motion-sensing arrangement 33 indicates the firearm movement, the firearm tracking device 30 is activated.

The data from the motion-sensing arrangement 33 may also be used to monitor the speed of firearm movement. Thus, to better track the firearm movement, when the firearm is on the move the system will emit signals with shorter intervals.

As to another aspect of the invention, to assure uncompromised power supply 37 to the GPS tracking device 30 and to the wireless signal emitting arrangement 38, if a battery (including a rechargeable battery) associated with the tracking device is depleted, a firearm automatically locks itself and cannot be fired.

By means of the signal emitting arrangement 38 and the emitting antenna 39, the operational data from the microprocessor 36 is wirelessly transmitted. Such data can be detected by a receiving antenna of the server 42 forming a part of the firearm-free zone processing system 40. The data can be also detected by multiple cellular tower receivers 50 of the common wireless communications carriers. It should be also noted that the signal emitting arrangement 38 can be preprogrammed to change all major characteristics of the signal randomly to prevent jamming. Also in one embodiment wireless signal emitting arrangement 38 can be calibrated to emit predetermined level of signals. In this manner, the signals can be used by the firearm-free-zone processing system 40 signal receiver to measure distance to the fire arm based on the intensity of the signal coming from the fire arm.

Signals from signal emitting arrangement 38 received by the cellular towers 50 are then retransmitted to the server 42 forming a part of the firearm-free-zone processing system 40.

The server 42 including a plurality of screens and electronic maps is provided at the public place location forming a part of a specific firearm-free-zone processing system 40. Accordingly, the server 42 is able to acquire and process knowledge of the operational circumstances of the firearm 20 approaching the restricted firearm-free-zone. On the other hand, a centralized server provided for multiple firearm-free-zones can be also utilized.

When the firearm with the tracking device 30 is brought in to a predetermined distance from the restricted firearm-free-zone 10, the signal will appear on the screen or the electronic map of the server 42. This serves as an indication that an unauthorized firearm approaches the restricted firearm-free-zone 10 or otherwise protected area. Optionally, sound or light alarm can be generated upon the unauthorized firearm approaching the restricted area. As a further option, the signal activates a security protocol, and is transmitted to the nearest law enforcement facility and/or a hospital. Further more, some other devices or systems within the public space facility can be activated like automatic door locks.

In a portable version of the invention, where smartphones are utilized as a part of the firearm-free-zone security/processing system, data tracking software for smartphones with GPS capability is used.

A GPS tracking device 30 uses the GPS to determine the precise location of the firearm approaching the restricted firearm-free-zone and to communicate the position of the approaching firearm at regular intervals. By means of the wireless signal emitting arrangement 38, the firearm location data is transmitted to the central location data base or a server 42 forming a part of the firearm-free-zone processing system 40. This allows the approaching firearm's location to be displayed at the central location data base or a server 42 against a map backdrop in real time using GPS tracking software.

On the other hand, an authorized firearm carried by a professional security personal or policemen will generate differently coded wireless signal. So such signal will appear on the screen or the electronic map of the server 42 in a different color. In this manner, a security operator looking at the screen will be able to immediately distinguish the presence of an authorized weapon from a non-authorized one, and to prevent unnecessary activation of the security protocol.

A retrofitable embodiment can be also provided, so that the tracking device 30 can be installed in already existing firearms for a tax credit.

The firearm tracking device 30 together with firearm-free-zone processing system 40 and corresponding means of communication are able to support a variety of data processing algorithms to be employed and suited to specific needs and criteria of a particular type of firearm-free-zone.

Figure 3:
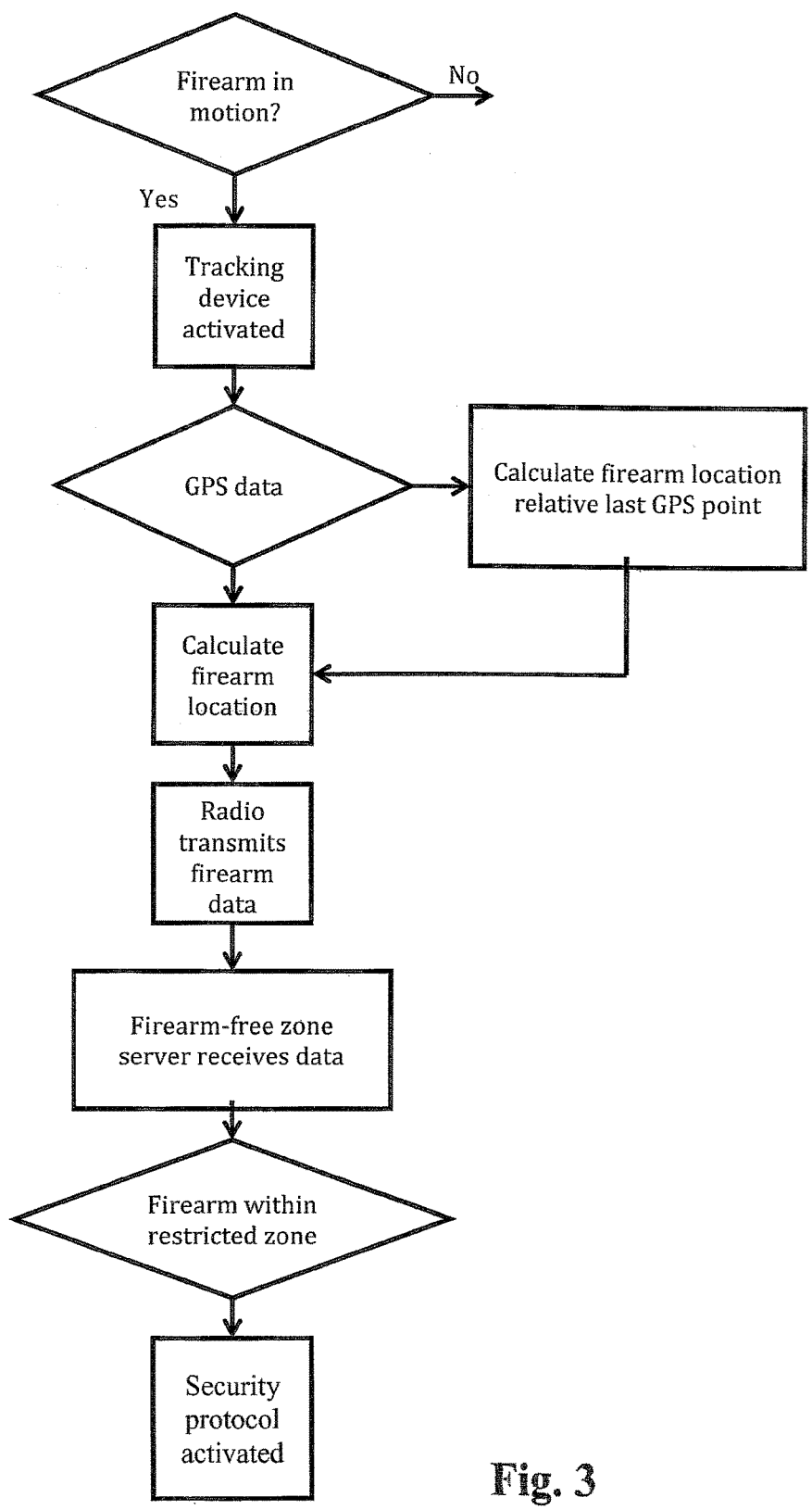
FIG. 3 shows an algorithm/operational flow chart of the communication system for tracking firearms of the invention.

Referring now to FIG. 3 depicting an operational flow chart or an operational algorithm according to one embodiment of the invention. When in use, the system of the invention implements the following steps:

Initially the internal positioning unit 35 and the motion-sensing arrangement 33 determine whether the firearm has moved or it is stationary. If the firearm has moved, the firearm tracking device 30 is activated.

When GPS satellite signal can be received and processed, geographic information, including time and position of the firearm is transmitted to the receiving arrangement 32 for further processing.

When the firearm is situated out of site of GPS satellite and the GPS satellite signal cannot be received, the internal positioning unit 35 is able to track position of the firearm relative to a known starting point. Such data from the internal motion-sensing arrangement 33 is processed by the microprocessor 36 to calculate the position of a firearm relative to such known starting point.

Based on the above information the firearm location is calculated. By means of the signal emitting arrangement 38, the operational data is wirelessly transmitted and detected by the receiving antenna of the server 42 forming a part of the firearm-free-zone processing system 40.

Optionally, the data can be detected by multiple cellular tower receivers 50 of the wireless communication carriers.

Upon processing the received data, the server 42, upon detecting an unauthorized firearm approaching the restricted zone, activates the security protocol. On the other hand, when authorized firearm is detected, no security protocol is activated.

The operational flow chart or operational algorithm discussed with respect to FIG. 3 represents one example of possible flow charts or algorithms. It is understood that there are a wide variety of possible algorithms can be provided to reflect operation of the security system of the invention.

Thus, the present invention provides the safety and security system to secure public safety by tracking firearms and to prevent penetration of unauthorized firearms into restricted firearm-free-zones. In the system tracking firearms of the invention is arranged through the use of the wireless tracking device, so that upon approaching the restricted zone by an unauthorized firearm a security protocol is activated.

What is claimed is:

1. A method of tracking firearms by an automatic electronic communications system disposed within the firearms, the system includes a signal receiving arrangement with a receiving antenna, an internal positioning unit disposed within said firearm formed with an internal motion-sensing arrangement disposed within said firearm, the internal motion-sensing arrangement including at least one of an accelerometer and a gyroscope, a microprocessor and wireless signal emitting arrangement with an emitting antenna, said method comprising the steps of:
    determining whether a firearm is moved by a user or stationary by utilizing the internal positioning unit and the motion-sensing arrangement;
    activating said signal receiving arrangement in response to detection of movement of the firearm;
    receiving, via said signal receiving arrangement, and processing, in said microprocessor, at least one signal from at least one satellite, to obtain geographic information including a position of the firearm at a given time point;
    tracking the position of the firearm relative to a previously identified location by processing data obtained from the internal motion-sensing arrangement including at least one of the accelerometer and a gyroscope, using the microprocessor, to calculate the position of the firearm relative to said previously identified location; and
    activating a security protocol upon identifying that said position of said firearm is in proximity to or within a firearm-free-zone.

2. The method of claim 1, wherein said step of receiving, via said signal receiving arrangement, and processing, in said microprocessor occurs when said signal receiving arrangement is in view of at least one satellite.

3. The method of claim 1, wherein said step of tracking the position of the firearm relative to a previously identified location occurs when said signal receiving arrangement is out of satellite sight.

4. The method of claim 1, further comprising the step of using said signal emitting arrangement, transmitting the position of said firearm to a receiving antenna associated with a server forming part of a firearm-free-zone processing system.

5. A method for tracking firearms to prevent penetration of unauthorized firearms into a restricted firearm-free-zone based on a public safety and security system, said system comprising:
    a firearm having at least a barrel and a handle;
    a firearm tracking device, disposed within said firearm and including:
        a positioning system signal receiving arrangement associated with a signal receiving antenna and adapted to receive a signal from a positioning system;
        a wireless signal emitting arrangement associated with a signal emitting antenna;
        an internal positioning unit disposed within said firearm formed with an internal motion-sensing arrangement disposed within said firearm, said internal motion sensing arrangement including at least one of a gyroscope and an accelerometer; and
        a microprocessor, functionally associated with said positioning system signal receiving arrangement, said wireless signal emitting arrangement, and said internal positioning unit,
        wherein said signal receiving antenna and said signal emitting antenna are disposed along said barrel of said firearm;
    said method comprising the steps of:
    using said internal positioning unit including at least one of the accelerometer and a gyroscope, indicating movement of said firearm by a user to said microprocessor;
    upon receiving an indication of movement of said firearm, activating the signal receiving arrangement; and
    in response to said internal positioning unit indicating said movement of said firearm, wirelessly transmitting position data of said firearm from said wireless signal emitting arrangement to a server forming a part of a processing system of said firearm-free-zone.

6. The method of claim 5, further comprising:
    generating firearm operational data by said microprocessor; and
    upon said positioning system signal receiving arrangement receiving a position of said firearm at a specific time, transmitting said operational data from said microprocessor to the server using the wireless signal emitting arrangement.

7. The method of claim 5, further comprising:
    using the microprocessor, calculating a position of the firearm relative to the restricted firearm-free-zone by timing the signals received from the positioning system signal receiving arrangement.

8. The method of claim 5, further comprising the step of activating a security protocol by said server upon receipt by said server of position data indicating that unauthorized said firearm is approaching the restricted firearm-free-zone.

9. The method of claim 5, wherein the signal receiving arrangement, the microprocessor and the wireless signal emitting arrangement are disposed within the handle of the firearm.

10. The method of claim 5, wherein the signal receiving antenna and the signal emitting antenna extend along the entire length of the barrel.

11. The method of claim 5, wherein the positioning system is Global Positioning System (GPS).

12. The method of claim 5, wherein the positioning system is Russian Global Navigation Satellite System (GLONASS).

13. The method of claim 5, further comprising the step of displaying on a screen or an electronic map of the server the position data transmitted by the wireless signal emitting arrangement in a colored light to facilitate recognition of presence of an unauthorized said firearm in the firearm-free-zone.

14. The method of claim 5, wherein when an authorized firearm approaches the restricted firearm-free-zone the signal generated by said wireless signal emitting arrangement is different from a signal generated when an unauthorized firearm approaches the restricted firearm-free-zone.

15. The method of claim 5, wherein the wireless signal emitting arrangement is configured to generate a wireless signal of variable frequency.

16. The method of claim 5, wherein said internal positioning unit tracks a position of said firearm relative to a known starting point based on data received from said motion-sensing arrangement of said firearm.

17. The method of claim 5, further comprising the step of calibrating said wireless signal emitting arrangement to emit signals having a predetermined intensity level, so that an intensity of said signals received by a signal receiver associated with said server are used to measure a distance of the firearm from the firearm-free-zone.

18. The method of claim 5, further comprising:
using the data from the motion-sensing arrangement including at least one of the accelerometer and a gyroscope to monitor a speed movement of said firearm, so that when the firearm has moved, the signal emitting arrangement emits signals at shorter intervals; and
locking said firearm by said microprocessor in response to at least one of an unauthorized attempt to remove at least a portion of said firearm tracking device, a malfunction of said firearm tracking device, or a power failure of a power source providing power to said firearm tracking device.

* * * * *